June 22, 1965  R. E. KREGER  3,190,593
ADJUSTABLE SET-UP BLOCKS
Filed Jan. 14, 1963
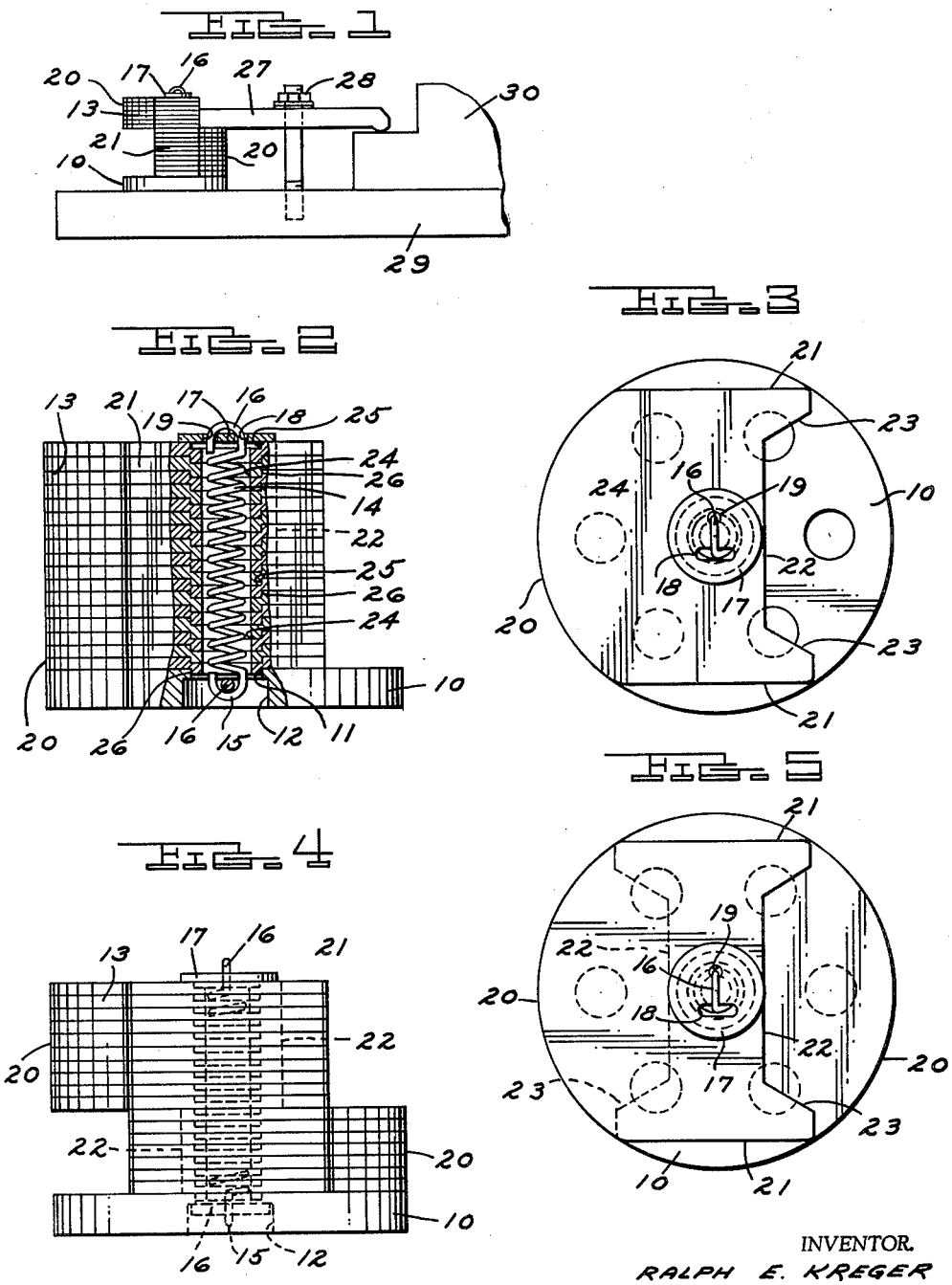
INVENTOR.
RALPH E. KREGER
BY Farley, Forster
and Farley
ATTORNEYS

United States Patent Office 3,190,593
Patented June 22, 1965

3,190,593
ADJUSTABLE SET-UP BLOCKS
Ralph E. Kreger, 2716 Vinsetta Blvd., Royal Oak, Mich.
Filed Jan. 14, 1963, Ser. No. 251,319
7 Claims. (Cl. 248—25)

This invention relates to a set-up block assembly which may be adjusted incrementally to any desired height for engagement by one end of a clamp dog or similar device in order to proivde a reaction surface at a desired level. The device consists essentially of thin plates pivotally stacked under spring tension on a base plate so that any number of the uppermost plates may be rotated 180° to bring relieved portions accommodating the end of a clamp dog into alignment with full portions of the remaining plates serving for clamp engagement at a desired level. The various objects and features of the invention may best be understood by reference to the drawings disclosing a preferred embodiment wherein:

FIGURE 1 is a fragmentary side elevation showing the set-up blocks in use for supporting one end of a clamp dog, the other end of which engages a workpiece or machine element;

FIGURE 2 is a side elevation of the set-up block assembly with all plates stacked in uniform relationship providing a minimum clamping height surface equal to the base thickness;

FIGURE 3 is a plan view of the set-up block assembly shown in FIGURE 2;

FIGURE 4 is a side elevation showing a number of the upper plates rotated to provide an intermediate level clamping surface; and FIGURE 5 is a plan view of the assembly shown in FIGURE 4.

With reference to the drawings the set-up block assembly comprises a circular base plate 10 having a central aperture 11 and counterbore 12, a plurality of adjustable plates 13 held in stacked relation on the base plate 10 by the tension of a double-hook spring 14, one end 15 of which engages a transverse locking pin 16 seated within the counterbore 12 of the base plate 10 and the other end 16 of which engages a top washer 17, having a slot 18 for passing and a hole 19 for receiving the hook end of the spring. As best shown in FIG. 3 each plate is formed with an arcuate portion 20 conforming to the outer perimeter of the base plate 10, a pair of flat surfaces 21 serving to facilitate manual rotation and alignment of any number of the plates to provide adjustment in the clamp stack height, and a recessed portion 22 with a pair of projecting ears 23 for accommodating and confining one end of a clamp dog or the like. An aperture 24 centered relative to the circular arc 20 and aligned with the aperture 11 and the base plate 10 is formed in each of the adjustable plates together with a step-shouldered recess 25 and annular projection 26, providing a nesting feature for holding the stack plates in relative alignment with each other. The tension spring 16 serves as a convenient means for holding the stack plates in assembled relation under a tension which permits them to be readily adjusted notwithstanding any irregularites or dirt particles between the inter-engaging surfaces while holding the same in any adjusted position during handling or fitting of the clamping dog, such as the dog 27 shown in FIG. 1 held by clamping bolt 28, engaging a machine base or table 29 and serving to clamp a workpiece or mahine element 30.

While a preferred embodiment of the present invention has been shown and described above in detail it will be understood that numerous modifications might be made in the detailed construction without departing from the scope of the invention as defined in the following claims.

I claim:

1. An adjustable set-up block assembly comprising a base, a stack of similar adjustment plates mounted on said base, alignable pivot apertures extending through said base and stack of adjustment plates, a resilient tension element extending through and adapted to hold said stack of plates and base in assembled relation, each of said plates having a recessed portion extending relatively close to its pivot aperture adapted to accommodate the end of a clamping dog and a diametrically opposed clamp supporting portion extending relatively far from its pivot aperture alternately alignable with the clamp supporting portion of said base through rotation of said plate about its pivot aperture, said base extending under the center of gravity of said assembly in all positions of adjustment.

2. A set-up block assembly as set forth in claim 1 wherein said base comprises a circular disc with a central aperture.

3. A set-up block assembly as set forth in claim 1 wherein said base comprises a circular disc with a central aperture, and said adjustment plates are provided with matching circular arc portions at the outer perimeter of the clamp supporting portion.

4. A set-up block assembly as set forth in claim 1 wherein said adjustment plates are provided with interengaging annular recesses and projections around the pivotal apertures providing self alignment.

5. A set-up block assembly as set forth in claim 4 wherein said resilient tension element comprises a helically coiled tension spring extending through said base and plate apertures.

6. A set-up block assembly as set forth in claim 1 wherein said resilient tension element comprises a helically coiled tension spring extending through said base and plate apertures.

7. A set-up block assembly comprising a circular base having a central counterbored aperture, a plurality of adjustment plates mounted on said base, each plate having an arcuate portion matching said circular base, an aperture aligned with said base aperture, a recessed portion extending relatively close to said aperture for accommodating the end of a clamping dog, an annular recess and projection around said pivotal aperture providing interengaging self-alignment with like projection and recess of adjacent plates, and a helically coiled tension spring adapted to hold said base and adjustment plates in assembled adjustable relationship.

References Cited by the Examiner
UNITED STATES PATENTS

| 1,200,134 | 10/16 | Reischmann | 248—361 |
| 2,400,708 | 5/46 | Parker | 269—93 X |
| 2,783,963 | 3/57 | Kalberg | 248—361 |
| 3,083,005 | 3/63 | Hefner | 269—91 |

CLAUDE A. LE ROY, *Primary Examiner.*